United States Patent [19]

Ortyn et al.

[11] Patent Number: 5,581,631
[45] Date of Patent: Dec. 3, 1996

[54] CYTOLOGICAL SYSTEM IMAGE COLLECTION INTEGRITY CHECKING APPARATUS

[75] Inventors: William E. Ortyn, Devall; Keith L. Frost, Seattle; Jon W. Hayenga, Kent, all of Wash.

[73] Assignee: NeoPath, Inc., Redmond, Wash.

[21] Appl. No.: 309,078

[22] Filed: Sep. 20, 1994

[51] Int. Cl.$^6$ .................................................. G06K 9/00
[52] U.S. Cl. .............................................. 382/128; 382/312
[58] Field of Search ............................... 382/280, 309, 382/311, 310, 128, 274, 307, 129, 130, 131, 132, 133, 134, 190, 209, 224, 312; 358/518, 505, 519, 521, 527, 523, 500, 515, 520, 522, 530, 400, 401; 348/78, 125, 135, 77

[56] References Cited

U.S. PATENT DOCUMENTS

| | | | |
|---|---|---|---|
| 4,202,033 | 5/1980 | Strobel | 364/416 |
| 4,589,774 | 5/1986 | Dupree et al. | 356/436 |
| 4,941,185 | 7/1990 | Reed | 382/280 |
| 4,998,284 | 3/1991 | Bacus et al. | 382/6 |
| 5,007,100 | 4/1991 | D'Aoust et al. | 382/49 |
| 5,038,216 | 8/1991 | Easterly et al. | 358/228 |
| 5,148,502 | 9/1992 | Tsujiuchi et al. | 382/280 |
| 5,164,913 | 11/1992 | Guilfoyle et al. | 364/713 |
| 5,170,279 | 12/1992 | Schwartz et al. | 359/217 |
| 5,173,788 | 12/1992 | Ohta | 382/280 |
| 5,191,621 | 3/1993 | Brok | 382/280 |
| 5,239,595 | 8/1993 | Takemura et al. | 382/280 |
| 5,255,085 | 10/1993 | Spence | 358/527 |
| 5,315,700 | 5/1994 | Johnston et al. | 395/163 |
| 5,361,140 | 11/1994 | Hayenga et al. | 358/446 |

OTHER PUBLICATIONS

Smith, Warren J., "Image Evaluation", *Modern Optical Engineering*, McGraw–Hill Book Company, 1966, pp. 308–325.

*Primary Examiner*—Leo Boudreau
*Assistant Examiner*—Bijan Tadayon
*Attorney, Agent, or Firm*—Leone & Moffa, P.A.

[57] ABSTRACT

An automated apparatus for checking cytological system image collection integrity in an automated cytological system including an imaging apparatus controlled by a digital processor. The automated apparatus includes linearity checking apparatus, coupled to the imaging apparatus and the digital processor. System frequency response is checked using a modulation transfer function, where the sampling frequency may be determined by pixel size so as to allow the MTF to be determined beyond the sampling frequency of a system detector. A system signal to noise ratio is also checked for specific regions of the frequency spectrum.

13 Claims, 10 Drawing Sheets

CYTOLOGICAL SYSTEM IMAGE COLLECTION INTEGRITY CHECKING APPARATUS

The present invention relates to a method for evaluation of image collection system performance in automated machine vision instruments. More specifically, the method for evaluation characterizes linearity, frequency response, signal to noise and pixel correction limits during operation for automated cytology instruments.

BACKGROUND OF THE INVENTION

Automated analysis of biological specimens requires a high degree of performance and consistency from the optical and electronic imaging systems. Image processing analyses of biological specimens use various segmentation algorithms and morphological operations that depend on consistent imagery for accurate and repeatable results. Performance of image collection systems comprised of imaging optics and detector electronics and a digital processor can be primarily characterized by three measurements. These measurements include modulation transfer function or frequency response, linearity and the signal to noise ratio. Image processing systems used for biological analysis may be used to make or help make diagnoses regarding the state of infections or disease of human subjects. Therefore, these diagnoses must be of the highest degree of integrity possible. Accordingly, the imaging systems used to capture images for processing must be checked frequently during operation to ensure highly consistent and accurate performance. The present invention provides techniques and apparatus used to characterize such systems during operation.

SUMMARY OF THE INVENTION

An automated apparatus for checking automated cytological system image collection integrity in an automated cytological system is provided including an imaging apparatus controlled by a digital processor. The automated apparatus includes linearity checking apparatus, coupled to the imaging apparatus and the digital processor. The modulation transfer function (MTF) of the image collection system is checked, where the MTF may be determined beyond one half the sampling frequency of the image collection system. A system signal to noise ratio is also checked for specific regions of the frequency spectrum.

This invention comprises a suite of tests to characterize the performance of the imaging system during operation. The test methods of the invention discussed herein are specifically directed by example to an automated machine visioning system having a pulsed arc lamp, biological microscope objectives and a CCD imaging device. However, the concepts of the invention may be employed to check other illumination sources, image collection devices and image capture electronics such as LASER sources, reflective optics, tube cameras, TDI sensors, PIN diodes and photomultiplier tubes.

It is one object of the invention to provide an improved means to characterize modulated transfer function of an imaging system.

It is another object of the invention to provide an improved means to characterize linearity of imaging system.

It is yet a further object of the invention to provide an improved means to characterize signal to noise of an imaging system.

It is still a further object of the invention to provide an improved means to characterize and evaluate the acceptability of an imaging system for automated cytological analysis.

It is yet another object of the invention to provide an improved means to characterize and evaluate the acceptability of an imaging system for any automated vision interpretation system.

It is yet another object of the invention to provide a runtime means to characterize and evaluate the acceptability of an imaging system for automated cytological analysis.

It is still a further object of the invention to provide an improved runtime means to characterize and evaluate the acceptability of an imaging system for any automated vision interpretation system.

It is yet another object of the invention to provide an improved means to characterize modulated transfer function of an imaging system with an undersampled detector.

It is still a further object of the invention to provide an improved means to characterize modulated transfer function of an imaging system simultaneously at numerous points in the field of view.

It is yet another object of the invention to provide an improved means to characterize modulated transfer function of an imaging system with a bar target that is easy to fabricate with low frequency patterns.

It is still a further object of this invention to provide an improved means to characterize modulated transfer function of an imaging system with a square wave bar pattern.

It is yet another object of this invention to provide an improved means to characterize the signal to noise ratio of an imaging system for specific regions of the frequency spectrum.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

DETAILED DESCRIPTION OF THE PREFERRED EMBODIMENT

In a presently preferred embodiment of the invention, the camera system disclosed herein is used in a system for analyzing cervical pap smears, such as that shown and disclosed in U.S. patent application Ser. No. 08/571,686, Dec. 13, 1995 which is a continuation of abandoned U.S. patent application Ser. No. 07/838,064, entitled "Method For Identifying Normal Biomedical Specimens", by Alan C. Nelson, et al., filed Feb. 18, 1992; issued U.S. patent application Ser. No. 08/179,812 filed Jan. 10, 1994 now U.S. Pat. No. 5,528,703 which is a continuation in part of abandoned U.S. patent application Ser. No. 07/838,395, entitled "Method For Identifying Objects Using Data Processing Techniques", by S. James Lee, et al., filed Feb. 18, 1992; U.S. patent application Ser. No. 07/838,070, now U.S. Pat. No. 5,315,700, entitled "Method And Apparatus For Rapidly Processing Data Sequences", by Richard S. Johnston, et al., filed Feb. 18, 1992; U.S. patent application Ser. No. 07/838,065, now U.S. Pat. No. 5,361,140 entitled "Method and Apparatus for Dynamic Correction of Microscopic Image Signals" by Jon W. Hayenga, et al. filed Feb. 18, 1992; and U.S. patent application Ser. No. 08/302,355, filed Sep. 7, 1994 entitled "Method and Apparatus for Rapid Capture of Focused Microscopic Images" to Hayenga, et al., which is a continuation-in-part of abandoned application Ser. No. 07/838,063 filed on Feb. 18, 1992 the disclosures of which are incorporated herein, in their entirety, by the foregoing references thereto.

The present invention is also related to biological and cytological systems as described in the following patent applications which are assigned to the same assignee as the present invention, filed on even date herewith, and which are all hereby incorporated by reference including pending U.S. patent application Ser. No. 303,179, filed Sep. 8, 1994, entitled "Cytological System Illumination Integrity Checking Apparatus and Method," to Ortyn et al.; pending U.S. patent application Ser. No. 309,130, filed Sep. 20, 1994, entitled "Cytological System Autofocus Integrity Checking Apparatus," to Ortyn et al.; U.S. Pat. No. 5,499,097 entitled "Automated Cytology System Position Integirty Checking Method and Apparatus" to Ortyn et al.; and pending U.S. patent application Ser. No. 08/309,249, filed Sep. 20, 1994, entitled "Biological Specimen Analysis System Processing Integrity Checking Apparatus" to Ortyn et al.

Figure 1A:
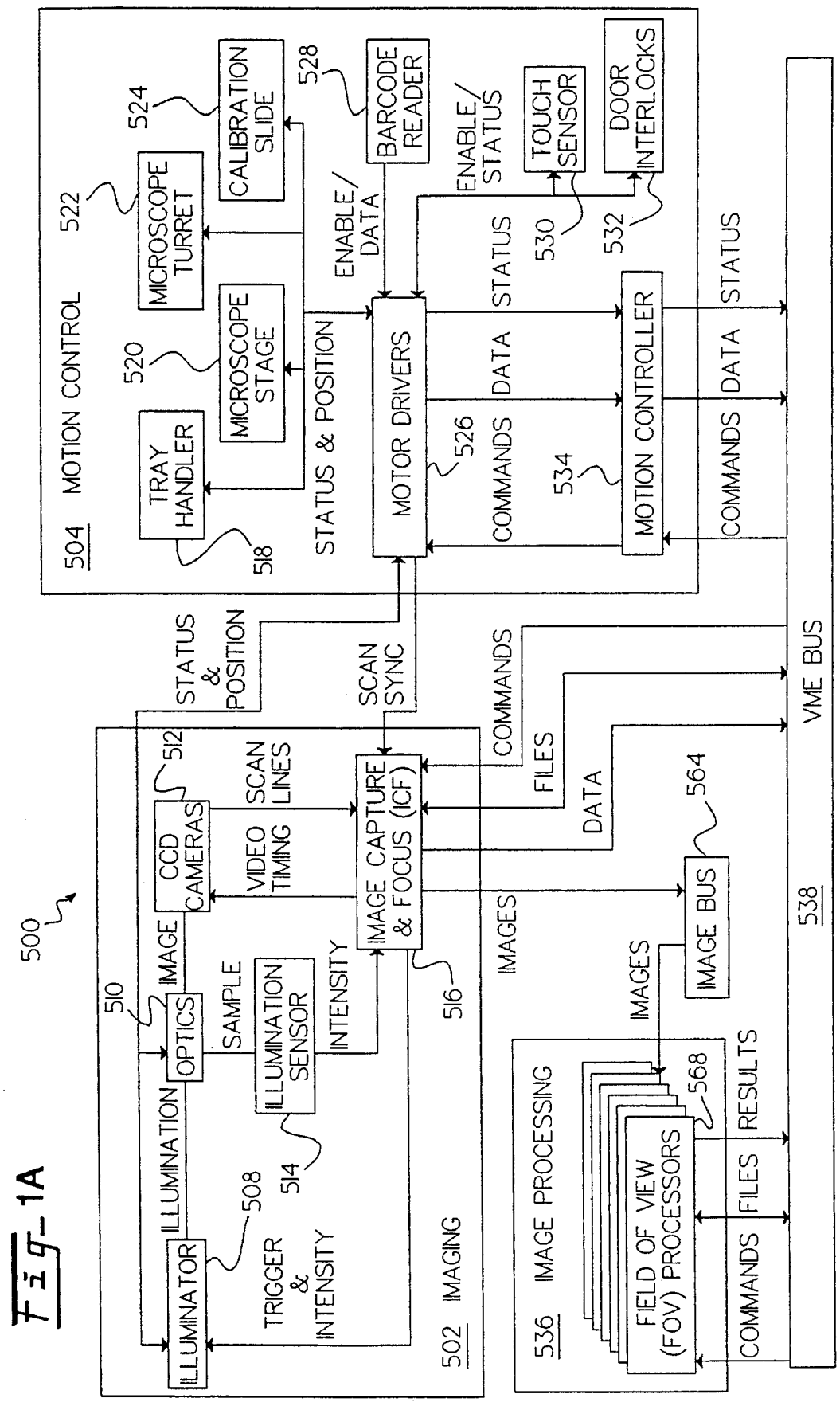
FIG. 1A and FIG. 1B show an automated cytology system and the placement of a calibration and test target into an optical path of an automated microscope as employed by the method and apparatus of the invention.
Figure 1B:
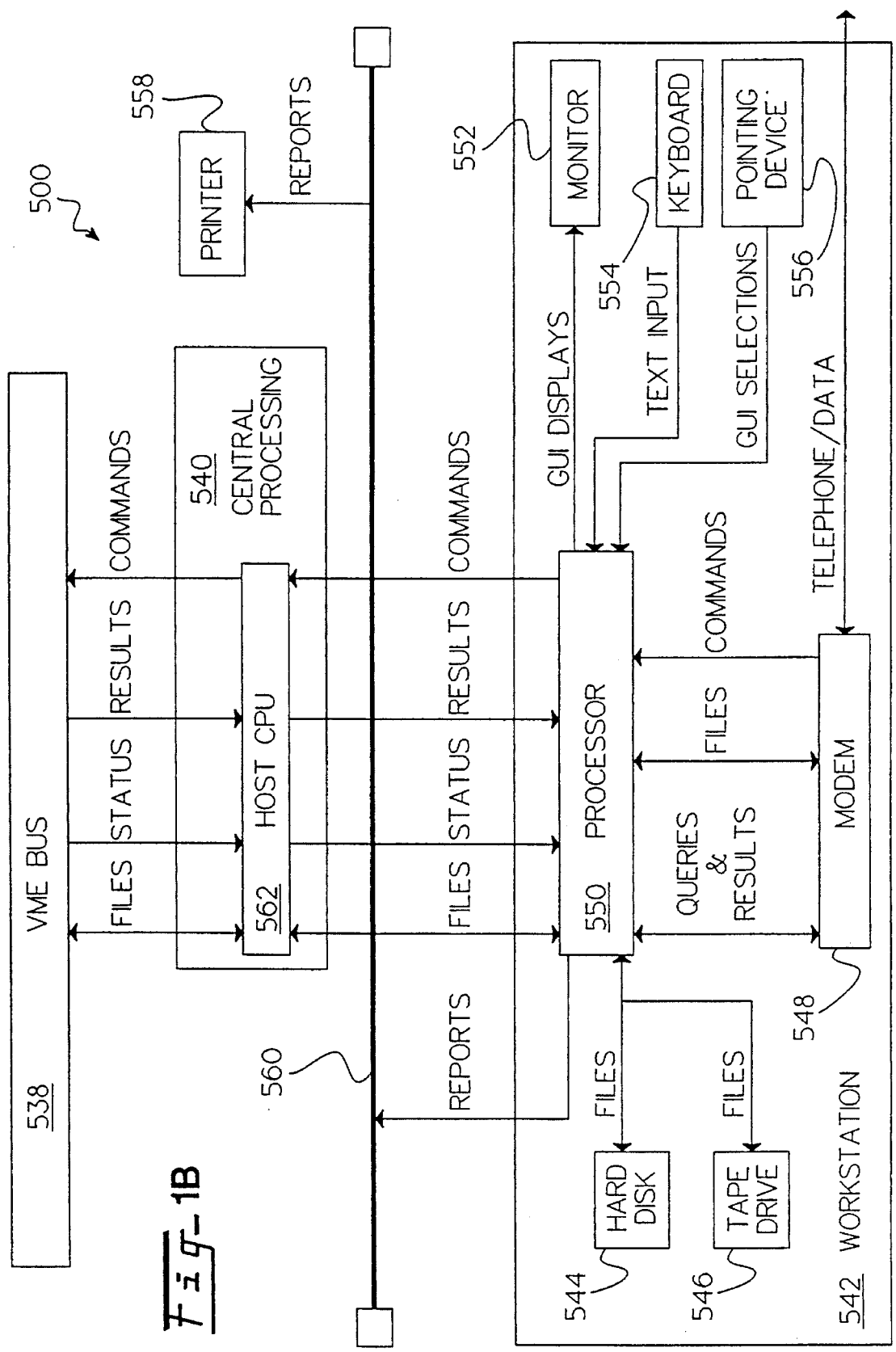

Now refer to FIGS. 1A and 1B which show a schematic diagram of one embodiment of the apparatus of the invention for checking illumination integrity for an automated microscope. While the method and apparatus of the invention will be discussed in terms of an example herein related to an automated cytology apparatus, it will be understood that the invention is not so limited. The features and principles of the invention may be applied to check urine analysis processes, semiconductor process defects, liquid crystal devices and other types of processing systems employing, for example, continuous arc lamps, filament lamps, laser sources, tube cameras, PIN diodes and photomultiplier tubes.

The apparatus of the invention comprises an imaging system 502, a motion control system 504, an image processing system 536, a central processing system 540, and a workstation 542. The imaging system 502 is comprised of an illuminator 508, imaging optics 510, a CCD camera 512, an illumination sensor 514 and an image capture and focus system 516. The image capture and focus system 516 provides video timing data to the CCD cameras 512, the CCD cameras 512 provide images comprising scan lines to the image capture and focus system 516. An illumination sensor intensity is provided to the image capture and focus system 516 where an illumination sensor 514 receives the sample of the image from the optics 510. In one embodiment of the invention, the optics may further comprise an automated microscope. The illuminator 508 provides illumination of a slide. The image capture and focus system 516 provides data to a VME bus 538. The VME bus 538 distributes the data to an image processing system 536. The image processing system 536 is comprised of field-of-view processors 568. The images are sent along the image bus 564 from the image capture and focus system 516. A central processor 540 controls the operation of the invention through the VME bus 538. In one embodiment the central processor 562 comprises a Motorola 68030 CPU. The motion controller 504 is comprised of a tray handler 518, a microscope stage controller 520, a microscope turret controller 522, and a calibration slide 524. The motor drivers 526 position the slide under the optics. A bar code reader 528 reads a barcode located on the slide 524. A touch sensor 530 determines whether a slide is under the microscope objectives, and a door interlock 532 prevents operation in case the doors are open. Motion controller 534 controls the motor drivers 526 in response to the central processor 540. An Ethernet (™) communication system 560 communicates to a workstation 542 to provide control of the system. A hard disk 544 is controlled by workstation processor 550. In one embodiment, workstation 542 may comprise a Sun Sparc Classic (™) workstation. A tape drive 546 is connected to the workstation processor 550 as well as a modem 548, a monitor 552, a keyboard 554, and a mouse pointing device 556. A printer 558 is connected to the Ethernet (™) network system 560.

During image collection integrity checking, the central computer 540, running a real time operating system, controls the automated microscope and the processor to acquire and digitize images from the microscope. The flatness of the slide may be checked, for example, by contacting the four corners of the slide using a computer controlled touch sensor. The computer 540 also controls the microscope stage to position the specimen under the microscope objective, and from one to 15 field of view (FOV) processors 568 which receive images under control of the computer 540.

Figure 2:
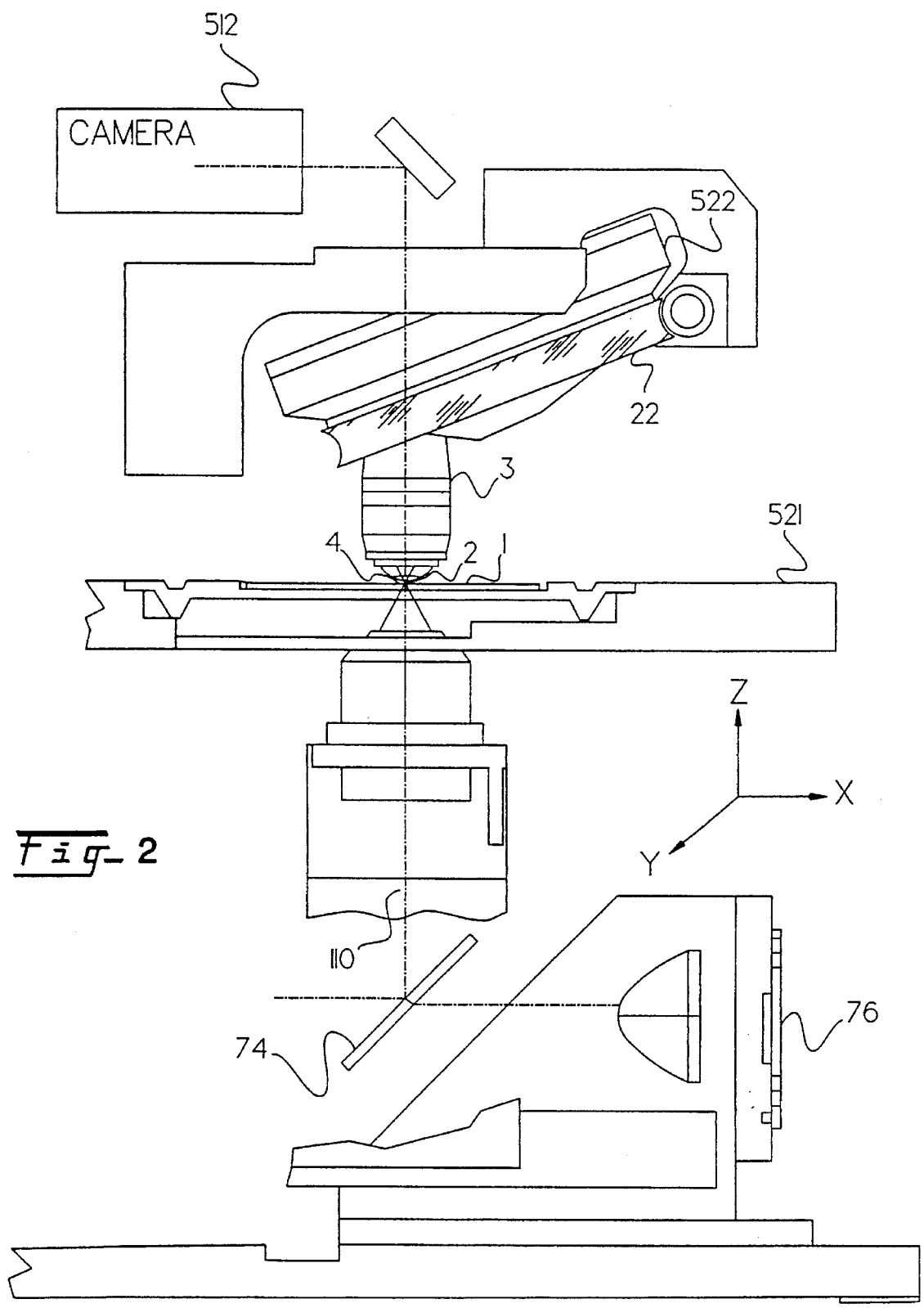
FIG. 2 schematically shows an automated microscope of the type used in automated cytological system having a calibration plate mounted on a movable stage.

Referring now to FIG. 2, there shown is placement of a calibration and test target 1 into an optical path of an automated microscope 3 having a turret 22. The calibration and test target may be mounted on a stage 521 substantially in a horizontal X,Y plane which intersects the optical path. The stage 521 is movable in the X,Y plane as well as along a Z axis which is perpendicular to the X,Y plane and which is parallel to the optical axis of the automated microscope. The turret 22 may comprise multiple objective lenses as is well known in the art. The microscope turret control 522 provides signals in a well known manner for positioning a selected objective lens into position for viewing a slide, for example.

It is to be understood that the various processes described hereinabove with respect to checking system linearity, system frequency response and system signal to noise ratio may be implemented in software suitable for running on a digital processor. The software may be embedded, for example, in the central processor 540.

Figure 3:
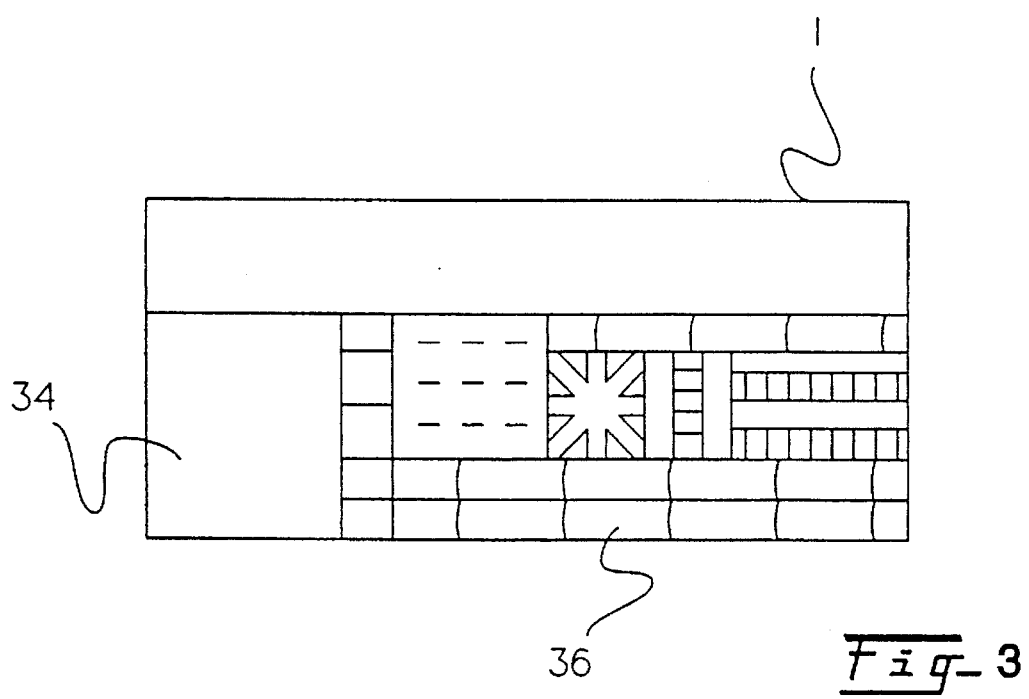
FIG. 3 shows one example of a calibration and test target or plate as used in one aspect of the invention.
Figure 4:
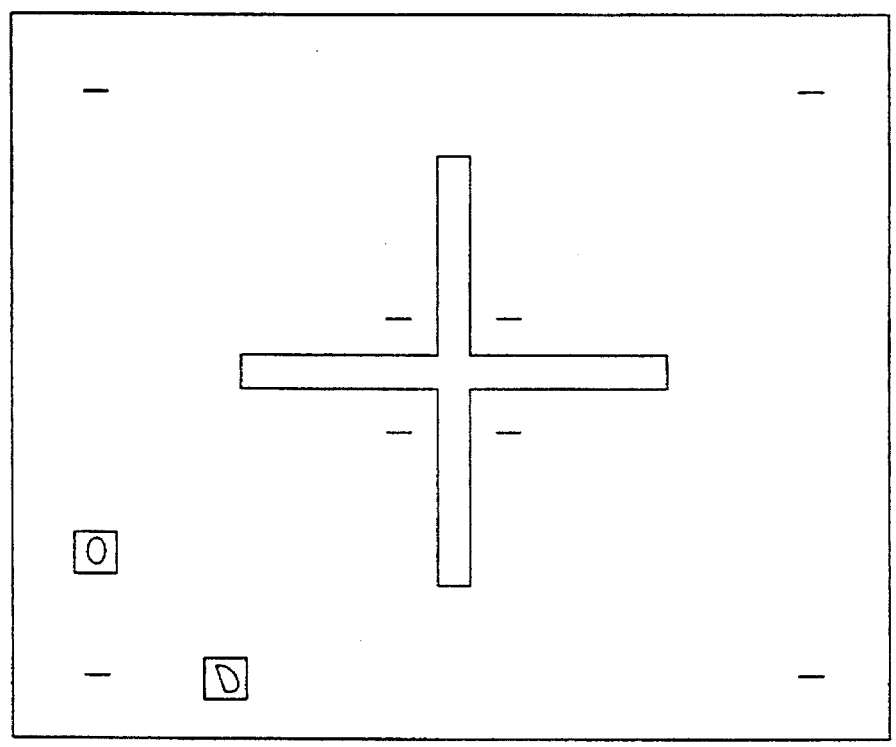
FIG. 4 shows an example of a fiducial marking.

Referring now to FIG. 3 one example of a calibration and test target is shown. Several of the processes employed by the present invention require a calibration and target plate. In the case of a transmission microscope, the calibration and test target 1 may comprise a piece of glass approximately 1.45 mm thick. The calibration and test target advantageously comprises specified clear areas 34 and/or image primitives, including periodic structure, such as horizontal and vertical bar targets 36. Other types of image primitives, such as fiducial markings, may also be used. FIG. 4 shows an example of a fiducial marking. Such calibration and test target plates may be used for most transmission microscopes to simulate the optical path difference effects introduced by the substrate, coverslip and specimen media. In some embodiments of the invention, the calibration and test target may be advantageously mounted onto a conventional cantilever arm for ease of placement onto and removal from the stage.

System Linearity Test

Figure 5:
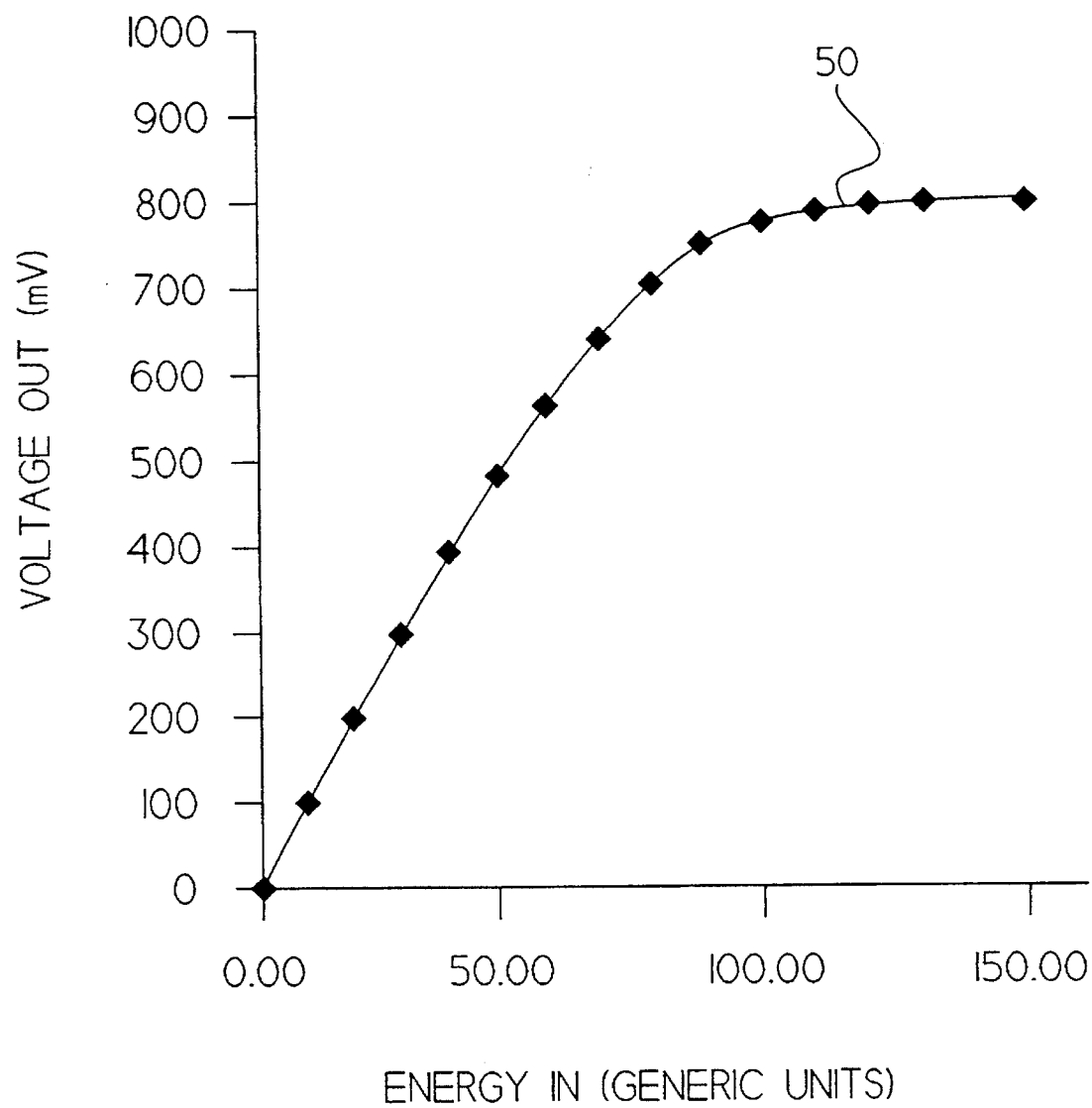
FIG. 5 shows a linearity profile for an automated cytology system.

Referring now to FIG. 5, a linearity profile for an automated cytology system is shown. The profile is plotted with respect to a horizontal axis representing energy in generic units and a vertical axis representing voltage output in millivolts. Linearity of response is the change in voltage out of a system with respect to the light level input. Note the characteristic saturation curve 50. In the region below 600 mV, corresponding to an input energy of about 70 units, the profile indicates that the system responds fairly linearly to a change in input energy. For voltages above 600 mV, the system appears to generate less of a voltage output for each additional energy input. After about 110 energy units of input, the system is saturated and no longer produces a change in voltage for a corresponding change in energy input.

Many components influence the linearity of an image capture system, such as an automated cytology analysis system, including the detector and subsequent electronics, optical components, stray light baffling and other elements. Most systems are designed for operation in the linear region. However, if a system is allowed to operate slightly into the nonlinear region, some dynamic range can be gained. This is often the case in many designs. In these types of systems it is critical that the system operate with the same characteristic linearity curve over time and temperature. Therefore, it is highly desirable to test system linearity.

Figure 6:
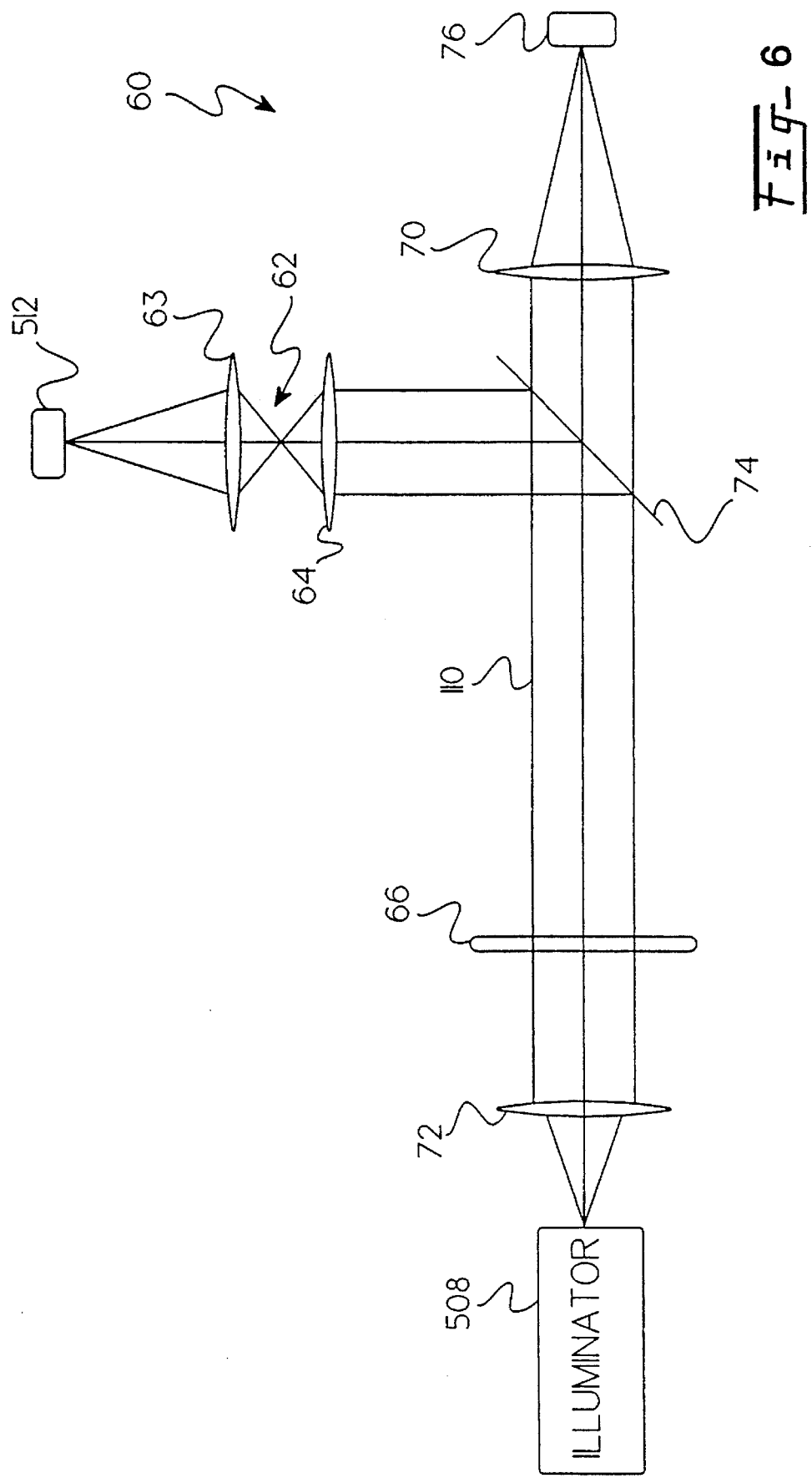
FIG. 6 schematically illustrates one example of a system apparatus used for testing linearity.

One example of a system linearity test apparatus is shown in FIG. 6. The linearity testing apparatus 60 comprises an illumination source 508, a camera 512, a specimen plane 62, a first lens 63, a second lens 64, a beam splitter 74, a photodetector 76, a neutral density wedge 66, a third lens 72, and a fourth lens 70. The first lens 63 may comprise an objective of an automated microscope, where the objective is selected to have a predetermined magnification and is positioned over the nominal clear area 34 of the calibration and target plate 1. It is advantageous to run the linearity test using objectives having high power and low power magnifications.

In one example using an automated microscope having two objectives, 20× and 4× magnifications are tested. The neutral density wedge 66 is positioned to yield a desired illumination level. A single image is acquired by the imaging apparatus and a mean pixel intensity is computed to characterize the camera response at the selected illumination level. The neutral density wedge 66 is positioned at another illumination level. A single image is again acquired and a second mean pixel intensity is computed to characterize the camera response at the second selected illumination level. This process is repeated for six different regions, in one example, to characterize the linearity profile of the system.

Figure 7:
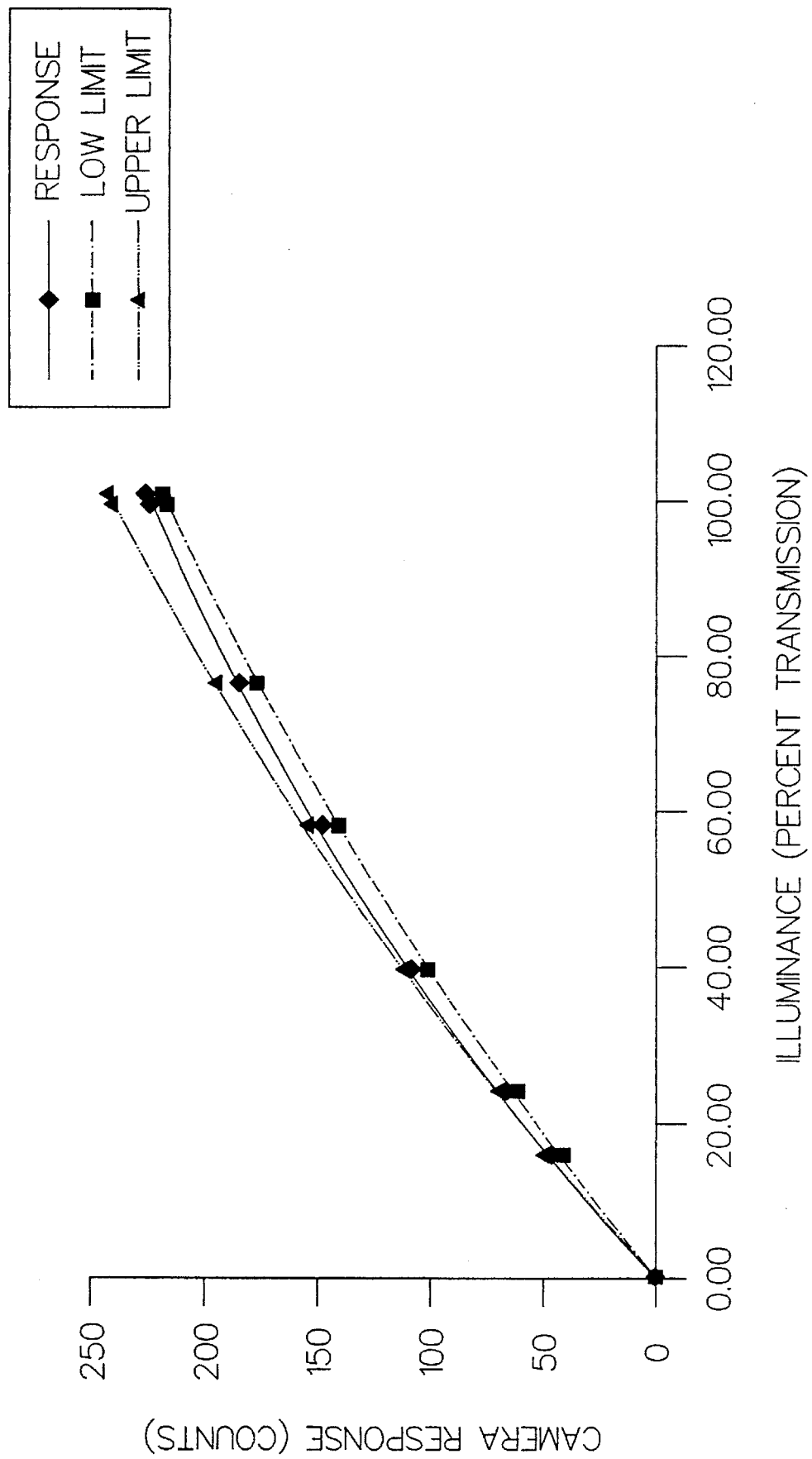
FIG. 7 is a linearity plot of an illumination sensor reading on the abscissa axis and the image collection system detector reading on the ordinate axis.

The embodiment of FIG. 6 employs a double beam system in which the illumination level is set by rotating the circular linearly variable neutral density wedge 66. Feedback for setting a selected illumination level is provided by the sensor 76 that receives light split off the main optical path 110 before it illuminates a specimen at specimen plane 62. FIG. 7 is a linearity plot which is essentially a plot of the illumination sensor reading on the abscissa axis and the camera reading on the ordinate axis. Table 2 shows the data plotted in FIG. 7 in tabular form. The sensor is previously calibrated to ensure its linearity. Therefore, the linearity plot is fundamentally a linearity plot of the system. The limits of the linearity test are dynamic and may be determined by the formula below. Limits on the camera response may be calculated as a function of the illumination or sensor response level. The sensor response level is the sensor response measured at a certain illumination as a percentage of the sensor response measured at 100% illumination.

The formula for calculating the camera response limit is given as $$\text{limit} = (\text{sensor response level}) * \text{slope} + \text{intercept}$$

Using this formula, the camera response limits may be determined with the information provided in Table 1.

TABLE 1

| Sensor Response | Linearity Limits | | | |
|---|---|---|---|---|
| | Minimum | | Maximum | |
| Level | Slope | Intercept | Slope | Intercept |
| 0–10% | 2.60 | 4.00 | 3.00 | 6.00 |
| 10–20% | 2.50 | 5.00 | 2.70 | 9.00 |
| 20–35% | 2.47 | 5.67 | 2.47 | 13.67 |
| 35–50% | 2.13 | 17.33 | 2.40 | 16.00 |
| 50–75% | 2.08 | 20.00 | 2.24 | 24.00 |
| 75–105% | 1.88 | 35.00 | 2.04 | 39.00 |

TABLE 2

| | Linearity Test Data, AP300 20X Camera Linearity | | |
|---|---|---|---|
| Illumination Level Illuminance | Camera Resp. Response | Minimum Low Limit | Maximum Upper Limit |
| 0.00% | 5.07 | 4 | 6 |
| 16.51% | 52 | 46.27 | 53.58 |
| 24.21% | 71.34 | 65.48 | 73.48 |
| 39.62% | 108,89 | 101.73 | 111.1 |
| 56.14% | 143.62 | 136.77 | 149.75 |
| 77.05% | 184.92 | 179.86 | 196.19 |
| 99.07% | 230.3 | 221.25 | 241.1 |
| 100.17% | 232.31 | 223.32 | 243.35 |

Modulation Transfer Function Test

Figure 8:
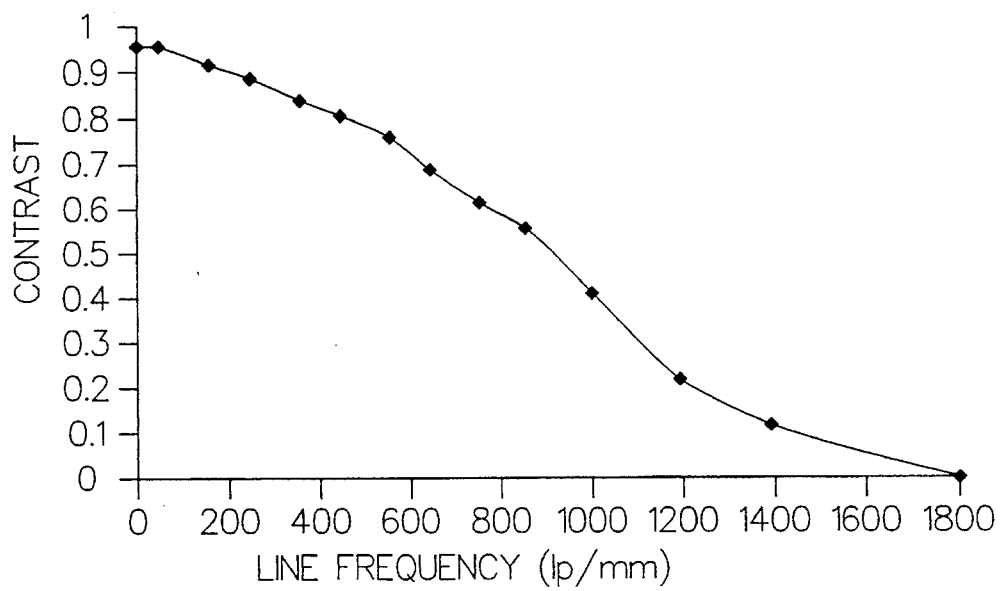
FIG. 8 shows an example of a modulation transfer function as employed in one embodiment of the invention.
Figure 9A:
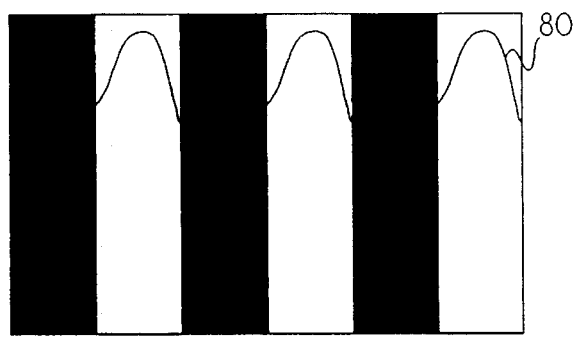
FIGS. 9A, 9B, 9C and 9D show bar patterns of progressively increasing spatial frequency and an intensity profile of those bar patterns in an image plane.
Figure 9C:
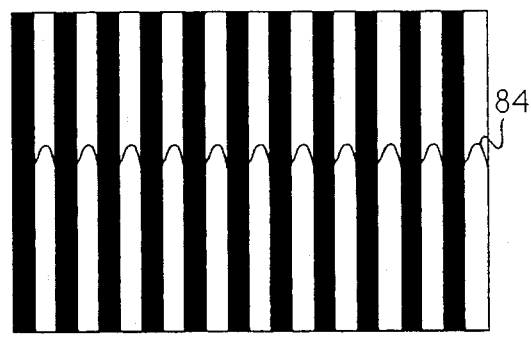
Figure 9B:
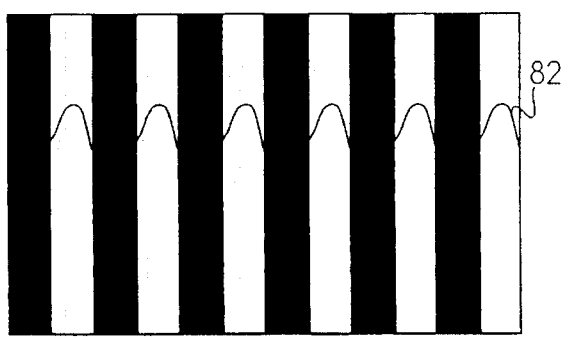
Figure 9D:
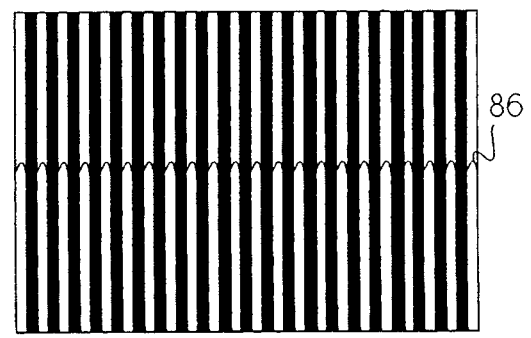

A Modulation Transfer Function (MTF) test characterizes the frequency response of the system. Modulation transfer functions are well known and typically comprise a curve of contrast in the image plane versus spatial line frequency of a sinusoidal input in the object plane. See, for example, Smith, *Modern Optical Engineering*, pp. 308–323, McGraw-Hill Book Company, 1966. FIG. 8 shows an example of an MTF. As the line frequency of the object increases, that is, as objects get smaller and closer together, the ability of an optical system to provide contrast in the image decreases. FIGS. 9A, 9B, 9C and 9D show bar patterns of progressively increasing spatial frequency. Also shown are intensity profiles 80, 82, 84 and 86 of those bar patterns in the image plane. As line frequency increases the contrast in the image plane decreases. Beyond a predetermined cutoff frequency, the contrast is zero (i.e. there is no modulation in the image).

Modulation is defined as follows:

Modulation=(max−min)/(max+min)

where: max and min are the maximum and minimum intensity values in the image plane.

There are typically two methods for generating an MTF curve. The first method involves conducting a series of contrast measurements over a set of discrete bar patterns. The contrast is measured at each bar pattern and a pseudo MTF curve is gradually generated. The first method does not actually generate an MTF curve because a true MTF test has a sinusoidal input. Sinusoidal targets are very difficult to generate and usually cannot be generated at even modestly high frequencies. Therefore, a bar pattern, which generates a square wave, is usually used. Although this is not true MTF, it is common practice. Another problem with the first method is that bar patterns, even square wave patterns, are difficult to generate at very high frequencies such as those above 250 lp/mm (i.e., 2 micron line widths). The problem is that many optical systems have a cutoff frequency around 2000 lp/mm. Therefore, this method can only test the pseudo (square wave) MTF in the lower part of the MTF curve up to 250 line pairs per millimeter.

Another method used to test MTF employs imaging a very small slit or small point of light in the object plane. If the slit or point is small relative to the optical resolution of the system, the resulting distribution of light in the image plane is referred to as the line or point spread function respectively. The convolution of the point or line spread function for a given optical system with a sinusoidal object (as an input function) yields the image (incorporating the contrast and phase shift) of that object for the system under test. Therefore, an MTF plot can be constructed by determining the line spread function in the manner stated and convolving it with a series of input sinusoids of varying frequency to determine the MTF function for a system. This method is often employed in MTF test systems for single lenses of low numeric aperture. In order for this approach to yield accurate results, two conditions must be met. First, the test sample (slit or point) must be small relative to the optical resolution of the system. Second, the magnification coupled with the pixel (or sample) size of the system must result in an accurate quantification of the point spread function. These two constraints are often difficult to meet. The following example demonstrates this fact. Consider a 20× optical system with a numeric aperture of 0.75 and a detector pixel size of 10 microns. In this system the diffraction limited optical resolution in the object plane is 0.4 microns (as determined by the formula below). In accordance, the entire Airy Disk (™) diameter is only 0.8 microns.

$\delta$ radius=0.61 $\lambda$/NA where: $\lambda$ is 0.500 microns

Likewise the pixel size in the object plane is {pixel size/magnification} or 10 microns/20=0.5 microns pixels. This case illustrates both problems with this method. First, it is difficult to manufacture a slit with a sub-micron width. Second, the pixel size of 0.5 microns is inadequate to sample a line or point spread function with an Airy Disk (™) diameter of 0.8 microns. There are not enough samples to reconstruct the function.

Both of the methods discussed above are inadequate to characterize the MTF of many optical systems. The method disclosed herein alleviates these shortcomings.

The method of the invention employs a single low frequency bar pattern to determine an actual MTF in a given axis. The frequency is low and the pattern is a square wave. Therefore, the target is easy to manufacture. The method of the invention also allows the MTF to be determined with respect to the cutoff frequency of the optical system and is relatively independent of the pixel size of the detector.

Figure 10A:
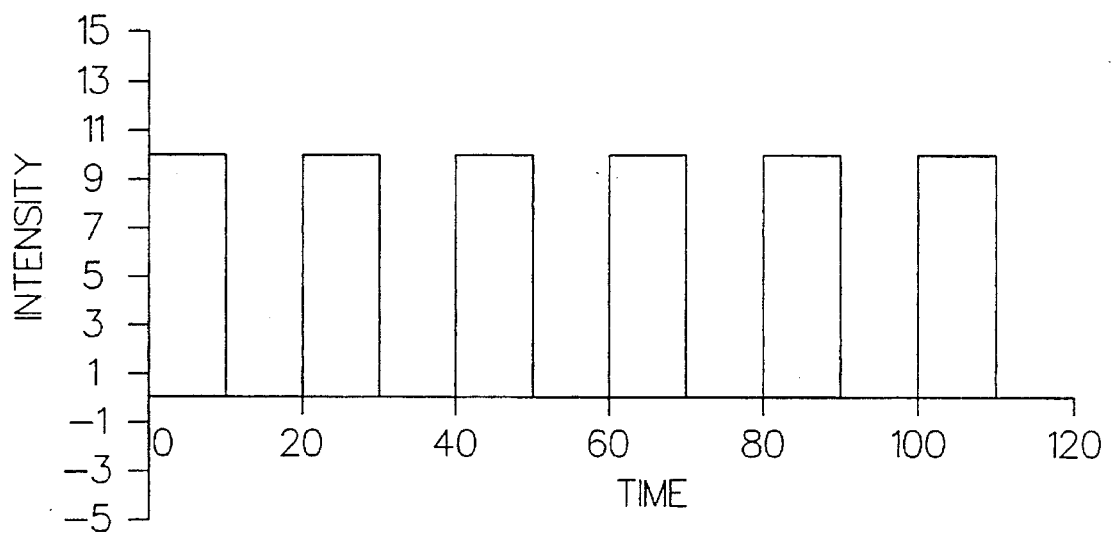
FIG. 10A shows a square wave plot for a theoretically perfect square wave.
Figure 10B:
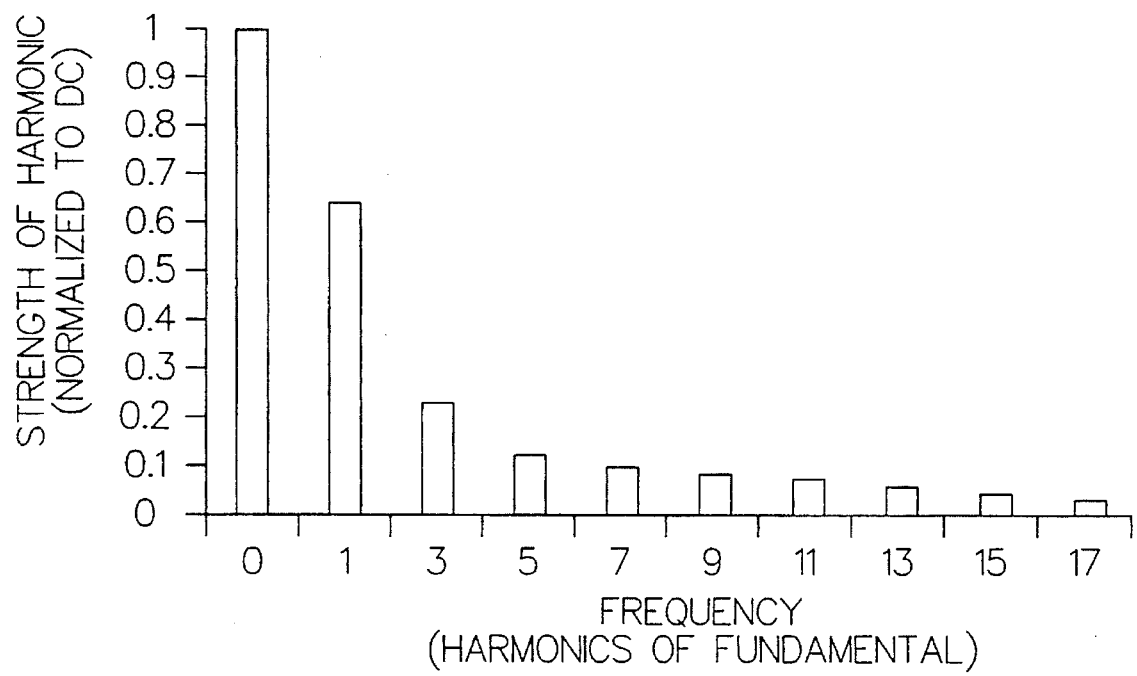
FIG. 10B shows the Fourier transform of a perfect square wave.

Fourier theory states that a periodic function of x with a spatial period of $\lambda$, can be synthesized by a summation of harmonic functions whose wavelengths are integral submultiples of $\lambda$ (that is $\lambda$, $\lambda/2$, $\lambda/3$ . . . ). This theory may be utilized judiciously in the case of MTF determination for an optical system. In this case, a square wave or bar target may be employed when one considers that a square wave is a summation of sinusoids whose wavelengths are the odd harmonics ($\lambda/3$, $\lambda/5$, $\lambda/7$ . . . ) of the original square wave frequency, $\lambda$. FIG. 10A shows a square wave plot. The Fourier transform of a perfect square wave, as represented in FIG. 10A, is shown in FIG. 10B. Note, the strength of the DC component or the 0 frequency point is half the intensity of the bright section of the input square wave. The DC component is equivalent to Ao/2, where Ao is the peak to peak intensity, that is, twice the amplitude, of the input square wave. Likewise, the strength of the fundamental frequency or first harmonic is, 4Ao/$\pi$. In accordance with the equation for the Fourier series expansion seen below, the strength of each additional harmonic is 1/N the strength of the fundamental frequency. For example, the contribution of the 5th harmonic is ⅕ that of the fundamental frequency.

Fourier Series Expansion for Square Wave $f(x)=Ao/2+4Ao/\pi$ (sin $kx$+⅓ sin $3kx$+⅕ sin $5kx$+ . . . )

The MTF of a real optical system may now be measured. A calibration and test target with image primitives of periodic structure, such as a bar target, may be placed in the object focal plane of the image collection system. An image of this image primitive may be acquired by the detector of the image collection system. Using discrete Fast Fourier Transform (FFT) techniques, the Fourier transform of the acquired image may be determined. The strength and frequency of the signal spectral peaks in the FFT may be quantified. It should be noted, as in the case of the bar target, that each signal peak represents one of the constituent sinusoids that comprise the square wave image of the bar target. Each signal spectral peak from the FFT of the acquired image can be divided by an equivalent signal spectral peak from the Fourier transform of a square wave, of scaled amplitude, representative of the bar target magnified by a reference amount. The amplitude of the square wave is scaled to match that produced by the perfect image of a bar target in the automated cytology system. The reference amount of magnification is equivalent to that expected of the image collection system. FIG. 10B shows the Fourier transform of such a square wave. Degradation in the strengths of the signal peaks between the FFT of the acquired image and Fourier transform of the representative square wave comprise the modulation loss created by the optical and electronic imaging systems. Those skilled in the art, having the benefit of this disclosure, will appreciate that a windowing function may be advantageously applied to the image prior to computing the FFT. A perfect optical system that suffers no loss in modulation from diffraction, aberrations, manufacturing tolerances or signal processing should reproduce the square wave pattern perfectly in the image plane. In this case, the FFT would produce a plot identical to that shown in FIG. 10B. It should also be noted that a perfect optical system is an impossibility primarily due to diffraction effects. A plot of the ratios of the strengths of each of the constituent harmonic frequencies is really a plot of the MTF of the system. Therefore, if a relatively low frequency square wave is used as the input waveform in the object plane, one could quantify the modulation of numerous frequencies out to the cutoff frequency.

One of the true strengths of the method of the invention lies in the ability to determine the MTF of the image collection system well beyond the classical Nyquist sampling rate of the image collection system detector. In this case, the signal peaks representing the higher order harmonics are present in the FFT, however, they appear as foldback peaks or aliases. These peaks fold back from the sampling frequency back onto the original harmonics. Therefore, a fundamental frequency may be chosen in conjunction with a sampling frequency of the image collection system detector to allow the foldback frequencies to appear in between the lower order harmonics. The sampling frequency may be advantageously determined by the cameras pixel size if the sample rate of the digital processor of the image collection system is synchronous and equal to that of the camera. With this method, the MTF may be determined well beyond the half (Nyquist) sampling frequency of the detector.

Figure 11:
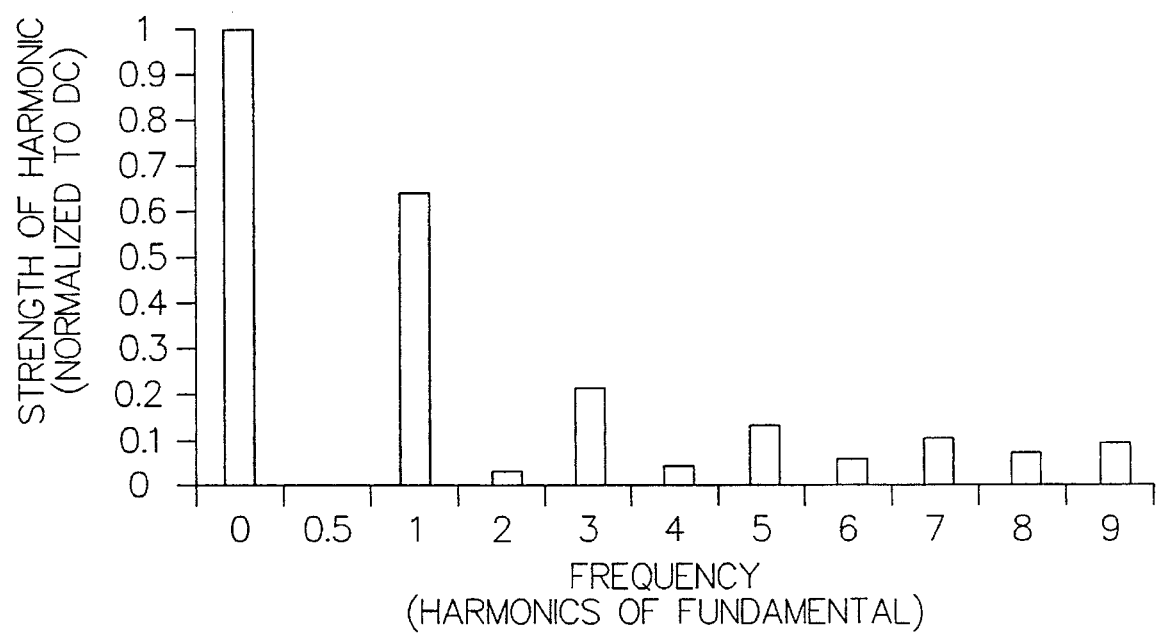
FIG. 11 shows one example of an FFT foldback for MTF determination beyond the detector sampling frequency.

FIG. 11 shows one example of an FFT foldback for MTF determination beyond the detector sampling frequency. Note, in this example, the sampling frequency of the detector was equal to a frequency of 9.5 times the fundamental. Therefore the higher harmonics, 11th, 13th etc., folded back into the location of the (missing) even harmonics. Note, that the strength of these harmonics is equal to the strength of the harmonics seen in FIG. 10B.

These techniques were employed to measure the MTF of an actual imaging system. The results are shown in Tables 3 and 4. Note the plots give the MTF at three locations in the Field of view for each direction. A vertical bar pattern with a line frequency of 50 lp/mm was used to determine the horizontal MTF. Likewise, a horizontal bar pattern was used for determination of vertical MTF. The optical system comprised a microscope objective with 20× magnification, 0.75 NA collection aperture and 0.45 NA illumination aperture. The camera pixel size was 11 microns in the image plane and 0.55 microns (11 microns/20×) in the object plane. The data is given for MTF in the object plane. This test was taken during operation of an automated cytological imaging and analysis system by intercepting the optical path with a glass target simulating a microscope slide with horizontal and vertical 50 lp/mm square wave targets.

Another strength of this technique lies in the diagnostic information that can be gleaned from the MTF data. For example, a fall off in the high frequency portion of the MTF curve suggests poor surface figure of turning mirrors and the like, or poor focus. These conditions may cause an aberration int he optical wave front that will reduce image definition, or contrast, of high spatial frequency objects while having a lesser effect on the contrast of low spatial frequency objects. Conversely, scattered light from fingerprints and dust on the surfaces of imaging optics or ambient light leaks will tend to raise the level of background light. This will more noticeably affect contrast in the image plane of low frequency objects. Both high and low frequency objects will loose contrast due to an increase in background light; however, the absolute value of contrast degradation of low frequency objects will be larger than that for high frequency objects. Therefore, various regions of the MTF curve, of the automated cytology system under test, can be compared to equivalent regions from a known and accepted MTF curve to determine valuable diagnostic information pertaining to the performance of the image collection system. Those skilled in the art will appreciate that other comparisons of the test and perfect MTF curves can yield other diagnostic information without departing from the scope of the invention.

Yet another strength in this technique lies in the ability to determine the magnification of the image collection system. In this case, the frequencies of preferably higher order spectral peaks, from the FFT of the target image can be compared to the expected frequencies from the Fourier transform of a square wave of scaled amplitude representing a target magnified by a reference amount. The amplitude of the square wave is scaled to match that produced by the perfect image of a bar target in the automated cytology system. For example, the FFT of an image of a bar target, generated by an image collection system, with an expected magnification of 20×, may yield a spectral peak at a frequency of 95 line pairs per millimeter. A perfect imaging system that has a magnification of exactly 20× may yield a spectral peak at 100 line pairs per millimeter. Therefore, the actual magnification of the test system is found by using the following formula:

$$\text{Actual Mag} = (\text{frequency perfect}/\text{frequency image collection system}) * \text{perfect mag}$$

In this case the magnification of the test system is actually 21×. Those skilled in the art will appreciate that this technique can be employed at numerous spectral peaks to improve the measurement without deviating from the scope of the invention.

TABLE 3

Vertical MTF
20X Vertical MTF for Three Portions of Field of View

| Freq Range | | Left | | | Center | | | Right | | |
| --- | --- | --- | --- | --- | --- | --- | --- | --- | --- | --- |
| min | max | freq | mtf | min | freq | mtf | min | freq | mtf | min |
| .0 | 0 | 0 | 0.951 | 0.839 | 0 | 0.939 | 0.839 | 0 | 0.937 | 0.839 |
| 48.0 | 52 | 49.7 | 0.951 | 0.91 | 49.7 | 0.95 | 0.91 | 49.7 | 0.953 | 0.91 |
| 144.0 | 156 | 149.1 | 0.924 | 0.87 | 149.1 | 0.925 | 0.87 | 149.1 | 0.928 | 0.87 |
| 240.0 | 260 | 248.5 | 0.885 | 0.819 | 248.5 | 0.885 | 0.819 | 248.5 | 0.893 | 0.819 |
| 336.0 | 364 | 348 | 0.845 | 0.75 | 348 | 0.84 | 0.75 | 348 | 0.85 | 0.75 |
| 432.0 | 468 | 447.4 | 0.799 | 0.66 | 447.4 | 0.798 | 0.66 | 447.4 | 0.803 | 0.66 |
| 528.0 | 572 | 546.8 | 0.76 | 0.55 | 550.4 | 0.743 | 0.55 | 550.4 | 0.756 | 0.55 |
| 624.0 | 676 | 649.8 | 0.675 | 0.449 | 649.8 | 0.683 | 0.449 | 649.8 | 0.698 | 0.449 |
| 730.0 | 780 | 749.2 | 0.607 | 0.349 | 749.2 | 0.623 | 0.349 | 749.2 | 0.632 | 0.349 |
| 816.0 | 884 | 848.7 | 0.545 | 0.250 | 848.7 | 0.542 | 0.259 | 848.7 | 0.549 | 0.259 |

TABLE 4

Horizontal MTF
20X Horizontal MTF for Three Portions of Field of View

| Freq Range | | Left | | | Center | | | Right | | |
| --- | --- | --- | --- | --- | --- | --- | --- | --- | --- | --- |
| min | max | freq | mtf | min | freq | mtf | min | freq | mtf | min |
| .0 | 0 | 0 | 0.953 | 0.839 | 0 | 0.955 | 0.839 | 0 | 0.95 | 0.839 |
| 48.0 | 52 | 49.7 | 0.928 | 0.899 | 49.7 | 0.925 | 0.899 | 49.7 | 0.926 | 0.899 |
| 144.0 | 156 | 149.1 | 0.813 | 0.769 | 149.1 | 0.809 | 0.769 | 149.1 | 0.811 | 0.769 |
| 240.0 | 260 | 248.5 | 0.659 | 0.61 | 248.5 | 0.654 | 0.61 | 248.5 | 0.658 | 0.61 |
| 336.0 | 364 | 348 | 0.516 | 0.449 | 348 | 0.512 | 0.449 | 348 | 0.51 | 0.449 |
| 432.0 | 468 | 447.4 | 0.397 | 0.319 | 447.4 | 0.396 | 0.319 | 447.4 | 0.391 | 0.319 |
| 528.0 | 572 | 546.8 | 0.31 | 0.219 | 546.8 | 0.302 | 0.219 | 546.8 | 0.303 | 0.219 |
| 624.0 | 676 | 646.8 | 0.239 | 0.129 | 649.8 | 0.238 | 0.129 | 649.8 | 0.232 | 0.129 |
| 730.0 | 780 | 749.2 | 0.183 | 0 | 749.2 | 0.185 | 0 | 749.2 | 0.18 | 0 |
| 816.0 | 884 | 848.7 | 0.15 | 0 | 848.7 | 0.158 | 0 | 848.7 | 0.154 | 0 |

Signal to Noise Test

All the concepts taught with respect to the method of the invention for determining a modulated transfer function described hereinabove are also employed in a signal to noise test as contemplated by the present invention. However, in the signal to noise test, all the signal peaks are summed. In addition, the rest of the bins, comprising non signal bins, of the FFT are also summed. The signal to noise ratio is the ratio of these sums. A signal to noise may thereby be developed for specific frequency regions of interest as well as for the entire spectrum. The signal to noise test steps described hereinabove were employed to determine the signal to noise ratio data seen in Table 5. The results in Table 5 are classified by portions of the spectrum. The first third is roughly the portion of the frequency spectrum between DC and 260 lp/mm. The second third is roughly the portion of the spectrum between 261 lp/mm and 572 lp/mm. The third third is the portion of the spectrum beyond 573 lp/mm. The overall signal to noise incorporates the entire spectrum.

TABLE 5

Signal to Noise Data, 20X System
Collection Signal to Noise

| Region | Results | Limits |
| --- | --- | --- |
| First Third: | S-N = 26.164 dB | min = 24.0 dB |
| Second Third: | S-N = 15.945 dB | min = 12.0 dB |
| Third Third: | S-N = 9.423 dB | min = 3.0 dB |
| Overall: | S-N = 28.026 dB | min = 26.0 dB |

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An automated apparatus for testing image collection system linearity in a cytological system comprising:
    a) a calibration and test target placed in an optical path;
    b) means, along the optical path, for illuminating the calibration and test target;
    c) a means for adjusting an illumination level at the calibration and target plate;
    d) means, in the optical path, for acquiring at least one image of the calibration and test target;
    e) means for sensing related illumination positioned to receive a portion of light from the illuminating means; and
    f) means for comparing having a first input receiving an image of the calibration and test target and a second input receiving an output from the sensing means.

2. An automated apparatus for checking modulation transfer function in a cytological system controlled by a digital processor, where the automated apparatus comprises:
    a) means for acquiring an image of an image primitive comprising periodic structure;

b) means, within the digital processor, for determining a Fast Fourier Transform (FFT) result of the acquired image, where the FFT result includes spectral peaks;

c) means, within the digital processor, for processing the FFT result to determine the strength and frequency of the spectral peaks; and d) means for dividing each FFT result spectral peak by the strength of an equivalent spectral peak from a reference Fourier transform of the image primitive.

3. An automated apparatus for checking signal to noise ratio in a cytological system controlled by a digital processor, where the automated apparatus comprises:

(a) means for acquiring an image of an image primitive comprising periodic structure;

(b) means, within the digital processor, for determining a Fast Fourier Transform (FFT) result of the acquired image, where the FFT result includes spectral peaks;

(c) means, within the digital processor, for processing the FFT result to determine the strength and frequency of the spectral peaks; and (d) means, coupled to the means for processing, to determine a first power contained in a spectral peak and means for determining a second power not contained in the spectral peaks in a predetermined frequency range surrounding the spectral peak; and (e) means for comparing the first and second powers.

4. An automated method for checking image collection system linearity in an automated cytological system controlled by a digital processor, where the automated method comprises the steps of:

a) positioning a calibration and test target in an optical path;

b) adjusting an illumination level at the calibration and test target;

c) acquiring at least one image of the calibration and test target;

d) independently sensing a related illumination level 1;

e) computing an illumination measure 2 over a region of the at least one acquired image;

f) comparing the computed illumination measure 2 with the related illumination level 1 to obtain a response measure;

g) repeating steps b–f at least once to obtain a plurality of response measures;

h) deriving an intensity response characteristic from the plurality of response measures; and i) comparing the intensity response characteristic to an allowed response range.

5. An automated method for checking image collection system modulation transfer function (MTF) in an automated cytological system controlled by a digital processor, where the automated method comprises the steps of:

a) positioning an image primitive comprising periodic structure in an image collection system object focal plane;

b) acquiring an image of the image primitive through the image collection system;

c) determining a Fast Fourier Transform (FFT) result of the acquired image;

d) processing the FFT result to determine the strength and frequency of the spectral peaks; and e) dividing each FFT result spectral peak by the equivalent spectral peak of a reference Fourier transform of the image primitive.

6. An automated method for checking system image collection integrity for an automated cytological system controlled by a digital processor where the automated method comprises the steps of:

(a) positioning an image primitive comprising periodic structure in an image collection system focal plane;

(b) acquiring an image of the image primitive;

(c) determining a discrete Fast Fourier Transform (FFT) result of the acquired image, wherein the FFT result comprises spectral peaks;

(d) processing the FFT result to determine the strength and frequency of the spectral peaks;

(e) determining a first power contained in a spectral peak and determining a second power not contained in the spectral peaks but in a predetermined frequency range surrounding the spectral peak; and (f) comparing the first and second powers.

7. The automated method of claim 5 where the step of positioning an image primitive further comprises the steps of:

(a) determining a coarse focus position of the image primitive;

(b) acquiring a plurality of images of the image primitive at a plurality of focal positions that includes a range of focal positions above and below an optimal focus position of the image primitive;

(c) obtaining a plurality of MTFs for the plurality of focal positions; and (d) deriving an optimal MTF from the plurality of MTFs.

8. The automated method of claim 5 further comprising the steps of determining the image collection system magnification by comparing the frequency of at least one FFT result spectral peak to the frequency of an equivalent spectral peak from a reference Fourier transform of the image primitive.

9. The automated method of claim 5 further comprising the step of testing image collection system optical wavefront aberrations by:

a) comparing at least one high frequency MTF value to a lower frequency MTF value to obtain a result; and b) comparing the result to a predetermined limit.

10. The automated method of claim 5 for characterizing the image collection system performance above one-half the sampling frequency of the image collection system further comprising the steps of:

a) selecting an image primitive including spectral content above a frequency which is one-half the sampling rate of the image collection system and selecting the periodicity of the image primitive such that its spectral peaks which fall above one-half the sampling frequency are folded back by the image collection system so as to interleave with the spectral peaks below one-half the image collection system sampling frequency; and b) using the peaks above one-half the sampling frequency to characterize the image collection system at frequencies above one-half the image collection system sampling frequency.

11. An automated method for checking image collection system modulation transfer function (MTF) in an automated cytological system controlled by a digital processor, where the automated method comprises the steps of:

(a) positioning an image primitive comprising periodic structure in an image collection system object focal plane;

(b) acquiring an image of the image primitive through the image collection system;

(c) determining a Fast Fourier Transform (FFT) result of the acquired image;

(d) processing the FFT result to determine the strength and frequency of the spectral peaks;

(e) dividing each FFT result spectral peak by the equivalent spectral peak of a reference Fourier transform of the image primitive; and (f) testing for image collection system scattered light or light leakage by
   (i) comparing at least one low frequency MTF value to a zero frequency MTF value to obtain a result, and
   (ii) comparing the result to a predetermined limit.

12. The automated method of claim 11 further comprising the step of testing image collection system optical wavefront aberrations by:

(a) comparing at least one high frequency MTF value to a lower frequency MTF value to obtain a result; and (b) comparing the result to a predetermined limit.

13. The automated method of claim 11 for characterizing the image collection system performance above one-half the sampling frequency of the image collection system further comprising the steps of:

(a) selecting an image primitive including spectral content above a frequency which is one-half the sampling rate of the image collection system and selecting the periodicity of the image primitive such that its spectral peaks which fall above one-half the sampling frequency are folded back by the image collection system so as to interleave with the spectral peaks below one-half the image collection system sampling frequency; and (b) using the peaks above one-half the sampling frequency to characterize the image collection system at frequencies above one-half the image collection system sampling frequency.

* * * * *

UNITED STATES PATENT AND TRADEMARK OFFICE
CERTIFICATE OF CORRECTION

PATENT NO. : 5,581,631
DATED : December 3, 1996
INVENTOR(S) : William E. Ortyn et al.

It is certified that error appears in the above-identified patent and that said Letters Patent is hereby corrected as shown below:

Column 3, line 16, after the "Ser. No.08/571,686," insert -- filed --.

Column 3, line 32, after the word "and" insert -- pending --.

Column 6, Table 2, (column 2, row 4), delete the number "108,89" and replace it with -- 108.89 --.

Column 10, line 11, delete the phrase "int he" and replace it with -- in the --.

Column 10, line 19, delete the word "loose" and replace it with -- lose --.

Signed and Sealed this

First Day of September, 1998

*Attest:*

BRUCE LEHMAN

*Attesting Officer*　　　*Commissioner of Patents and Trademarks*